US012349755B2

(12) United States Patent
Bullard et al.

(10) Patent No.: US 12,349,755 B2
(45) Date of Patent: Jul. 8, 2025

(54) HELMET RIM LIGHTING SYSTEM FOR PROTECTIVE HEADGEAR

(71) Applicant: Crustacean Concepts LLC, Clarkston, MI (US)

(72) Inventors: Rockwood Boles Bullard, Clarkston, MI (US); Adam Michael Denz, Clarkston, MI (US)

(73) Assignee: Crustacean Concepts LLC

( * ) Notice: Subject to any disclaimer, the term of this patent is extended or adjusted under 35 U.S.C. 154(b) by 0 days.

(21) Appl. No.: 18/313,304

(22) Filed: May 5, 2023

(65) Prior Publication Data

US 2023/0354942 A1 Nov. 9, 2023

Related U.S. Application Data

(60) Provisional application No. 63/338,993, filed on May 6, 2022.

(51) Int. Cl.
*A42B 3/04* (2006.01)
*A42B 1/242* (2021.01)
(Continued)

(52) U.S. Cl.
CPC .......... *A42B 3/0446* (2013.01); *F21V 21/084* (2013.01); *F21V 21/088* (2013.01); *A42B 1/242* (2013.01); *A42B 1/244* (2013.01); *A42B 3/0433* (2013.01); *A42B 3/044* (2013.01); *A42B 3/0453* (2013.01); *F41H 1/04* (2013.01)

(58) Field of Classification Search
CPC ..... A42B 3/0433; A42B 3/044; A42B 3/0446; A42B 3/0453; A42B 1/242; A42B 1/244; F21S 4/20-28; F21Y 2107/70; F41H 1/04
See application file for complete search history.

(56) References Cited

U.S. PATENT DOCUMENTS 5,327,587 A 7/1994 Hurwitz
5,544,027 A 8/1996 Orsano
(Continued)

FOREIGN PATENT DOCUMENTS

CN 101766358 A * 7/2010 ............. A42B 3/044

OTHER PUBLICATIONS

Machine translation of CN-101766358-A retrieved from the FIT database of PE2E search. (Year: 2024).*

*Primary Examiner* — Colin J Cattanach
(74) *Attorney, Agent, or Firm* — Richard G. Topolewski

(57) ABSTRACT

A helmet rim lighting system comprises a helmet attach mechanism and a housing holding electronics. When attached to a helmet, the housing produces both forward and downward lights. The forward light is generated by at least one forward-facing light, and the downward light is produced by at least one downward-facing light. The forward light directs light from the center horizontally to the left and right, both over 90 degrees, while the downward light is directed towards the ground, continuing the downward line of the helmet's edge. The helmet attach mechanism is designed to match the contour of a helmet's front rim. The system can independently activate the forward and downward lights and may include a single input for control. The housing and circuitry are waterproof, and the diffuser can serve as a gasket.

1 Claim, 19 Drawing Sheets

(51) Int. Cl.

| | |
|---|---|
| ***A42B 1/244*** | (2021.01) |
| ***F21V 21/084*** | (2006.01) |
| ***F21V 21/088*** | (2006.01) |
| ***F41H 1/04*** | (2006.01) |

(56) References Cited

U.S. PATENT DOCUMENTS

| | | | | |
|---|---|---|---|---|
| 5,836,673 | A | 11/1998 | Lo | |
| 6,733,150 | B1 * | 5/2004 | Hanley | F21V 21/0885 2/209.13 |
| 7,086,749 | B1 | 8/2006 | Hanley | |
| 7,192,151 | B2 | 3/2007 | Clupper et al. | |
| 8,025,432 | B2 | 9/2011 | Wainright | |
| 8,117,676 | B1 | 2/2012 | Cardoso | |
| 10,378,744 | B2 | 8/2019 | Arena et al. | |
| 2007/0159810 | A1 * | 7/2007 | Kim | F21V 21/08 362/105 |
| 2008/0080170 | A1 | 4/2008 | Lombard | |
| 2012/0075886 | A1 * | 3/2012 | Park | G02B 6/0083 362/611 |
| 2013/0201664 | A1 * | 8/2013 | Harooni | A42B 3/044 362/106 |
| 2013/0223070 | A1 * | 8/2013 | Baker | F21V 33/0076 362/244 |
| 2014/0268683 | A1 * | 9/2014 | Waters | A42B 1/244 362/106 |
| 2014/0268684 | A1 * | 9/2014 | Waters | A42B 1/244 362/382 |
| 2014/0304891 | A1 * | 10/2014 | Waters | A42B 1/24 2/209.13 |
| 2015/0327615 | A1 | 11/2015 | Gelb | |
| 2018/0133060 | A1 | 5/2018 | Patel et al. | |
| 2019/0350291 | A1 * | 11/2019 | Maldonado | F21V 21/084 |
| 2019/0390844 | A1 * | 12/2019 | Sedlacek | F21V 21/084 |
| 2021/0195979 | A1 | 7/2021 | Baker et al. | |
| 2021/0270455 | A1 | 9/2021 | Lombard | |
| 2021/0345721 | A1 * | 11/2021 | Hoppe | A42B 3/225 |

* cited by examiner

500

Prior Art

1700A

1700B

1700C

Prior Art

1800A

1800B

HELMET RIM LIGHTING SYSTEM FOR PROTECTIVE HEADGEAR

BACKGROUND OF THE DISCLOSURE

1. Field of the Disclosure

The present disclosure relates to a helmet mounted lighting system for protective headgear, more specifically, a helmet rim lighting system to work at night or in low light conditions.

2. Discussion of the Related Art

Various helmet mounted lights are used in the military, construction, mining and in emergency response (for example, firefighters and police). Many current combat helmet lights interfere with other accessories and safety equipment (ear protection). These helmet mounted lights are used to improve the visibility of the work environment but often require a mount already attached to the helmet that puts the light source away from the users' eyes that produces dark shadows for the user. The current helmet mounted lights often provide a focused beam of light that provides uneven lighting if used in a small or enclosed work environment The users of such helmet mounted lights often require amount to be already inexistence on the helmet, and once the light is mounted on the mount, the light can protrude substantially from the helmet. The protruding helmet mounted lighting systems tend to get caught on obstacles, for example getting snagged on branches when traveling in a forest. Further these light-emitting devices also can interfere with other helmet mounted devices, making it difficult to use the helmet mounted lighting system with other helmet mounted devices.

Combat helmets may have few mounting locations that limit the field of illumination and ultimately can cause disruption of the illumination into the field of vision of the wearer. Mounting location and focus beam may cause disruption in the illumination of an object in a user's field of view on rotation/repositioning of the head and blockage of the illumination from environmental obstacles that come in front of the light source.

What is needed is a lighting system that provides even lighting of the work environment that minimizes shadows and avoids snagging on environmental obstacles and works well with other helment mounted items.

SUMMARY OF THE INVENTION

A helmet rim lighting system that includes a helmet attach mechanism configured to attach to the rim of a helmet and a housing that holds electronics. When the helmet attach mechanism is attached to the rim of a helmet, the housing is configured to produce a forward light and a downward light. The forward light is produced by at least one forward-facing light and the downward light is produced by at least one downward-facing light. The forward light directs light from the center horizontally to the left more than 90 degrees and to the right more than 90 degrees, while the downward light directs light towards the ground, continuing the downward line of the edge of the helmet.

The helmet attach mechanism may be a groove that matches the contour of the front rim of a helmet, where the groove is configured to accept the front rim of the helmet. The groove may be slightly smaller than the front rim such that when placed on the front rim, the friction of the groove keeps the rim lighting system attached to the helmet. The downward-facing light is provided by at least one right-angle surface mount light emitting diode, and the forward-facing light is provided by at least one surface mount light emitting diode. Both the forward-facing light and the downward-facing light are mounted to the same circuit board, which may be flexible.

The helmet rim lighting system also includes an input device that can turn on the forward-facing light and the downward-facing light. The mounting system is part of the housing. The infra-red light comes from two sources that are far left and right of a forward light-producing region to minimize shadow. The infra-red lights are diffused. The housing holding the electronics is waterproof, with circuitry that is waterproof treated and a diffuser that serves as a gasket.

The forward light and the downward light can be independently activated, and one independent activation can be done via a single input.

DETAILED DESCRIPTION

Figure 1:
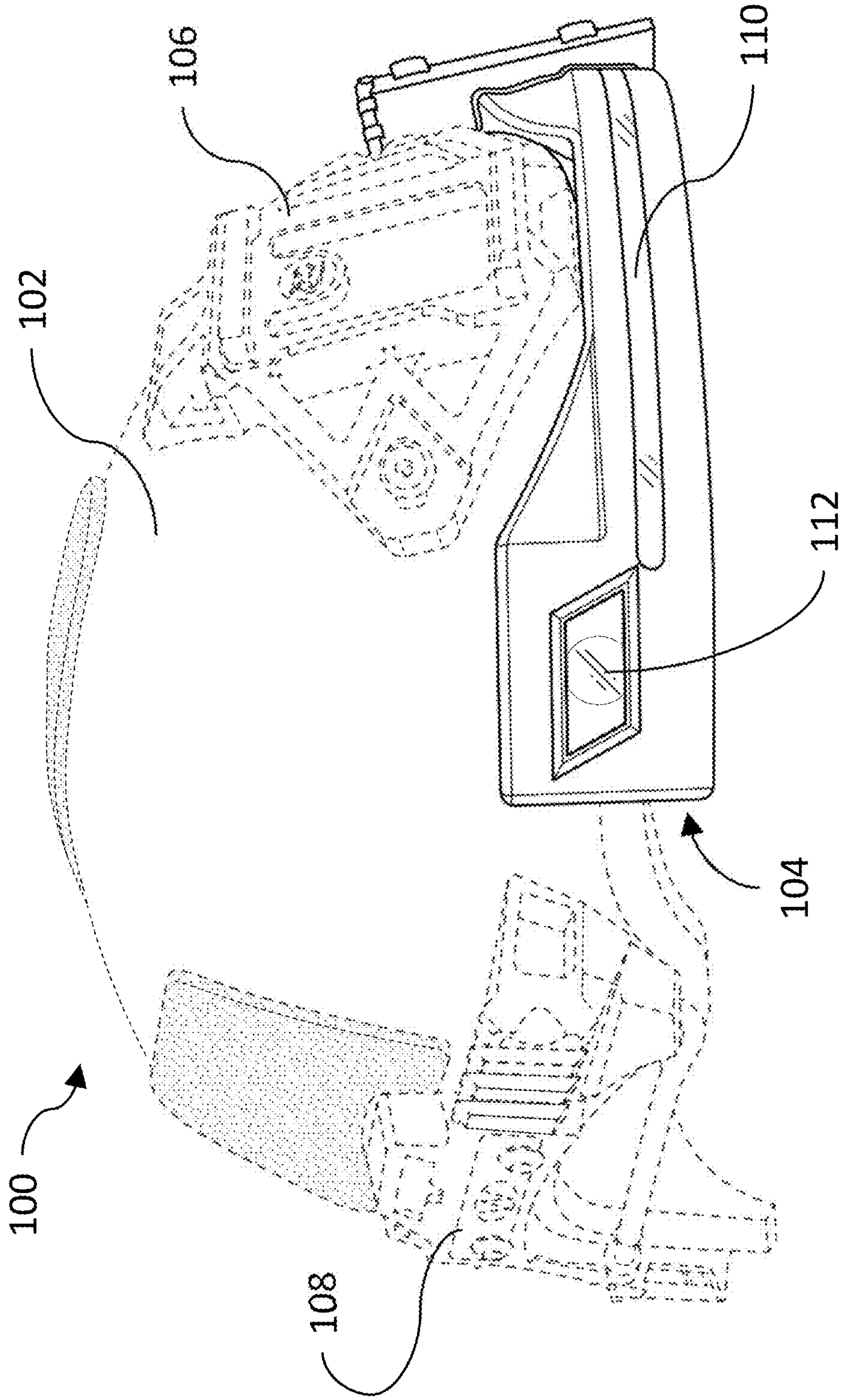
FIG. 1 illustrates a rim lighting system mounted on a military helmet.

FIG. 1 has an illustration 100 of a military helmet 102 with a rim lighting system 104, a Night Vision Goggles (NVG) mount 106, and a flashlight mount 108. The rim lighting system 104 is shown with a forward light 110, and an input button 112. The rim lighting system 104 is located at the front rim of the helmet.

The helmet may be solid shell with a suspension system to engage a head of a user, for example cushions mounted to the inside of the helmet. The rim lighting system 104 may be applied to a wide variety of helmets, including, protective helmets for sports such as bicycling and skiing, firefighter helmets, miner helmets, logging helmets, welder and foundry worker helmets, military or combat helmets and other protective helmets or rigid headgear.

FIG. 1 illustrates a military helmet 102 equipped with a rim lighting system 104, a Night Vision Goggles (NVG) mount 106, and a flashlight mount 108. The rim lighting system 104 is shown with a forward light 110 and an input button 112, positioned at the front rim of the helmet.

The helmet may be a solid shell with a suspension system, such as cushions mounted inside, to secure the user's head. The rim lighting system 104 can be applied to various helmet types, including protective helmets for sports, fire-fighting, mining, logging, welding, military, and other rigid headgear.

Designed to be thin and low-profile, the rim lighting system 104 minimizes snagging risks while having the ability to be used concurrently with other helmet-mounted devices. The system may be less than 10 mm thick, or better yet, less than 5 mm, preferably under 3.5 mm thick, and even more preferably under 2 mm thick for better streamlining. The rim lighting system 104 may weigh under 160 grams, more preferably under 80 grams, and most preferably under 40 grams. The rim lighting system 104 may generate different light colors, for example, white light, red light, and infrared light, and may feature densely packed ultra-high output LEDs.

The rim lighting system 104 may have multiple light sources, such as the forward light 110 and a downward light. A control unit may be provided for selecting individual light sources. The control unit may take input from the input button 112, which serves as an activation switch. The activation switch may require a hold period, for example, three seconds, to avoid accidental activation.

The housing of the rim lighting system 104 is thin, lightweight, and encloses the forward light, a downward light, batteries, and electronics. It adds minimal additional bulk to the forward helmet profile. The rim lighting system 104 also includes a helmet attach mechanism for easy attachment to the helmet.

Figure 2:
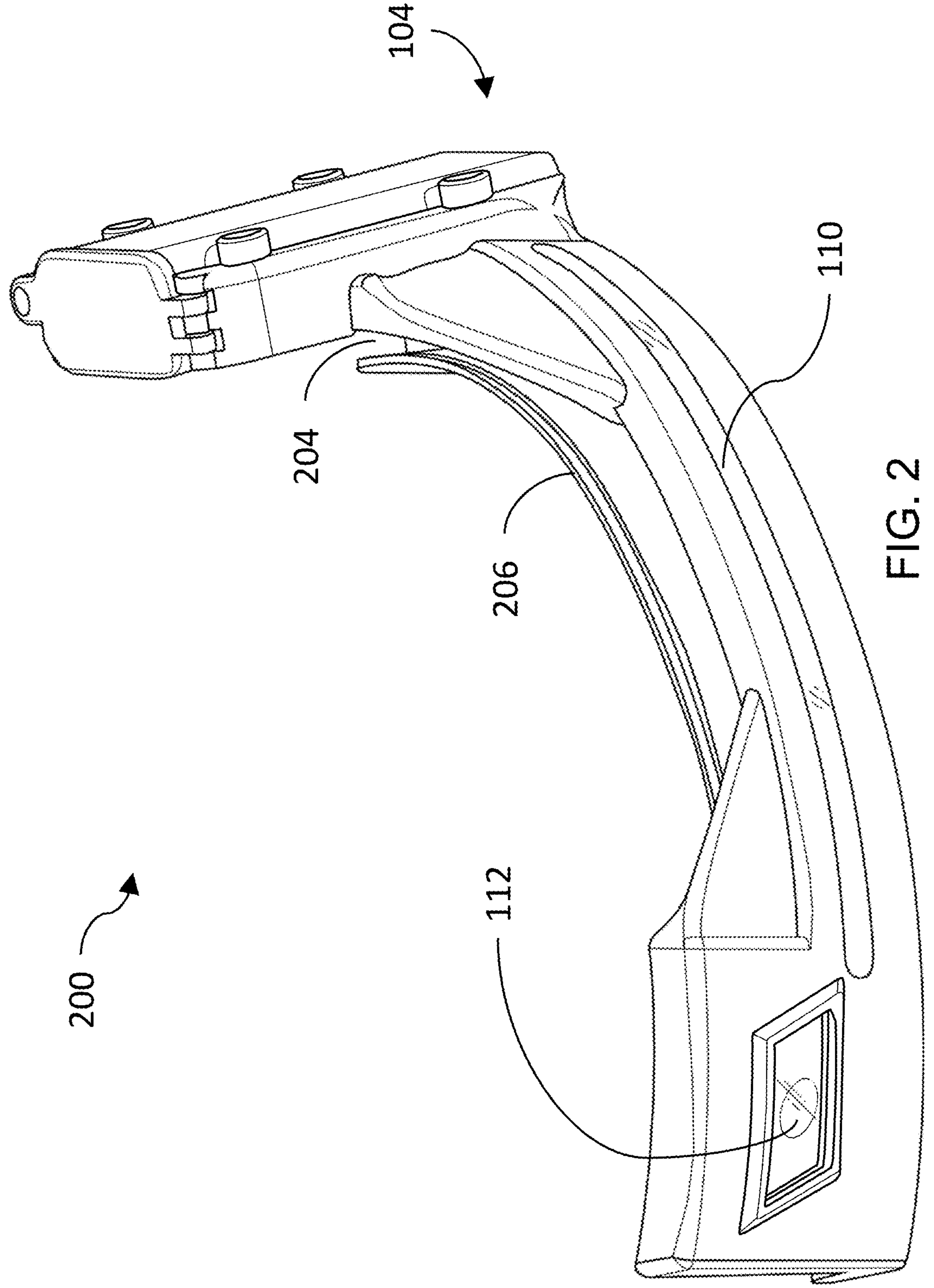
FIG. 2 illustrates a top perspective view of the rim lighting system with a groove that accepts the rim of a helmet.

FIG. 2 illustrates atop perspective view 200 of the rim lighting system 104 with a groove 204 as the helmet attach mechanism.

The mounting location of the rim lighting system 104, for example on the front rim, may provide users with the full functionality of the helmet since it has a low profile and may not interfere with other helmet mounted devices.

Figure 19:
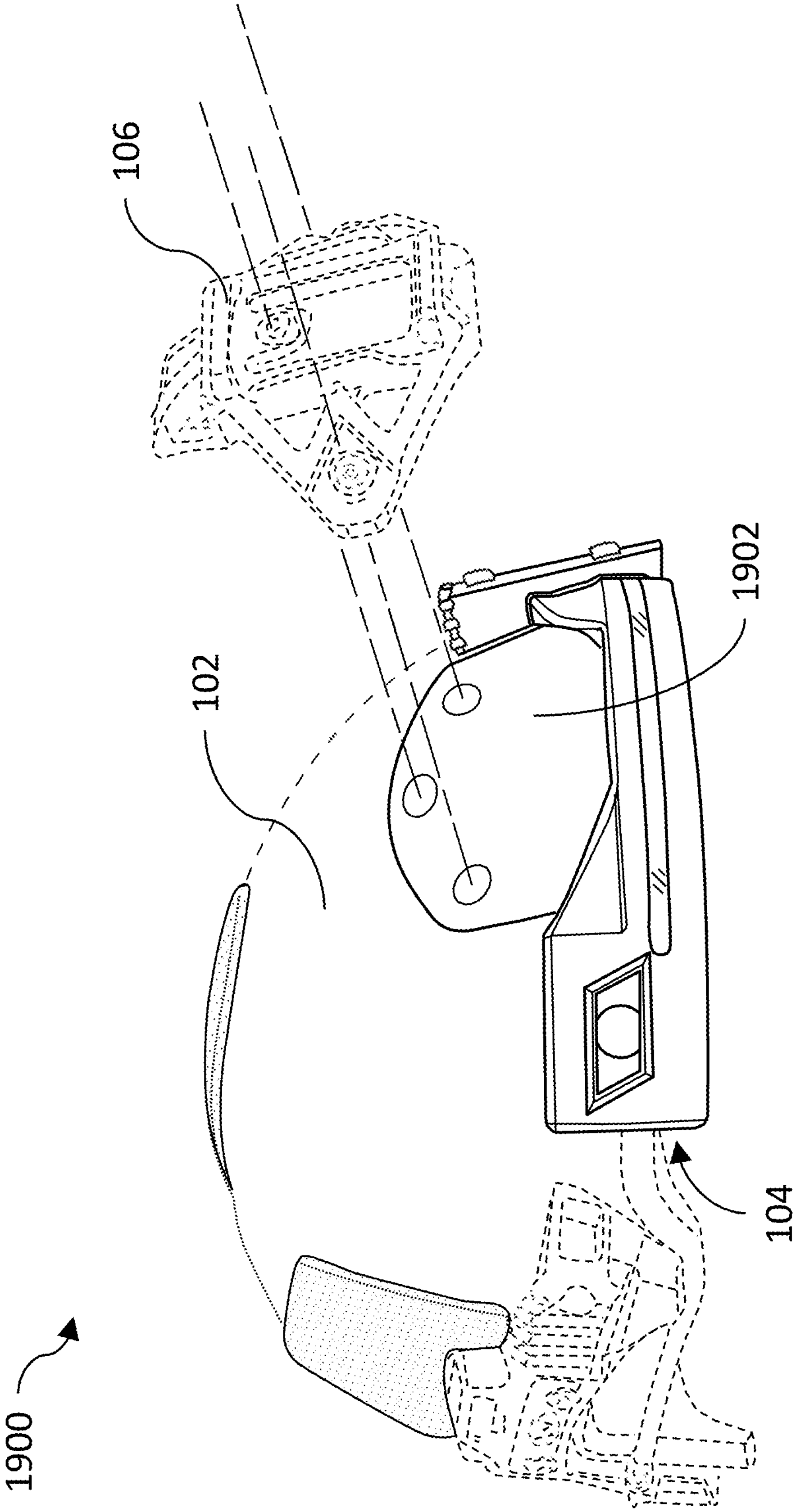
FIG. 19 illustrates an exploded view of a rim lighting system with a helmet having a rim lighting system having a thin extension going under a night vision goggle mount.

FIG. 19 shows a helmet rim lighting system 1900 with the helmet attach mechanism having a thin extension 1902 to extend to the bolt holes on the Night Vision Goggles NVG mount 106. The thin extension 1902 may be 1 mm thin or less, or 0.5 mm thin or less. The thin extension 1902 may allow for mechanical attachment to the NVG mount 106, and the thin extensions 1902 may go under the NVG Mount 106, so the NVG Mount 106 may still be bolted on with the rim lighting system 104 using the thin mechanical attachment 1902 being held in place by the NVG Mount bolts that are holding the NVG Mount 106.

The helmet attach mechanism may comprise a groove 204 that is configured to engage the front rim 402 of the helmet. The friction between the groove 204 and the front rim 402 of the helmet may retain the rim lighting system 104 in position on the helmet.

The radius down the center of the groove may be slightly smaller than the radius of the rim, such that when the groove accepts the rim the compression against the inner wall binds against the rim and the rim lighting system 104 stays in place on the rim.

Figure 3:
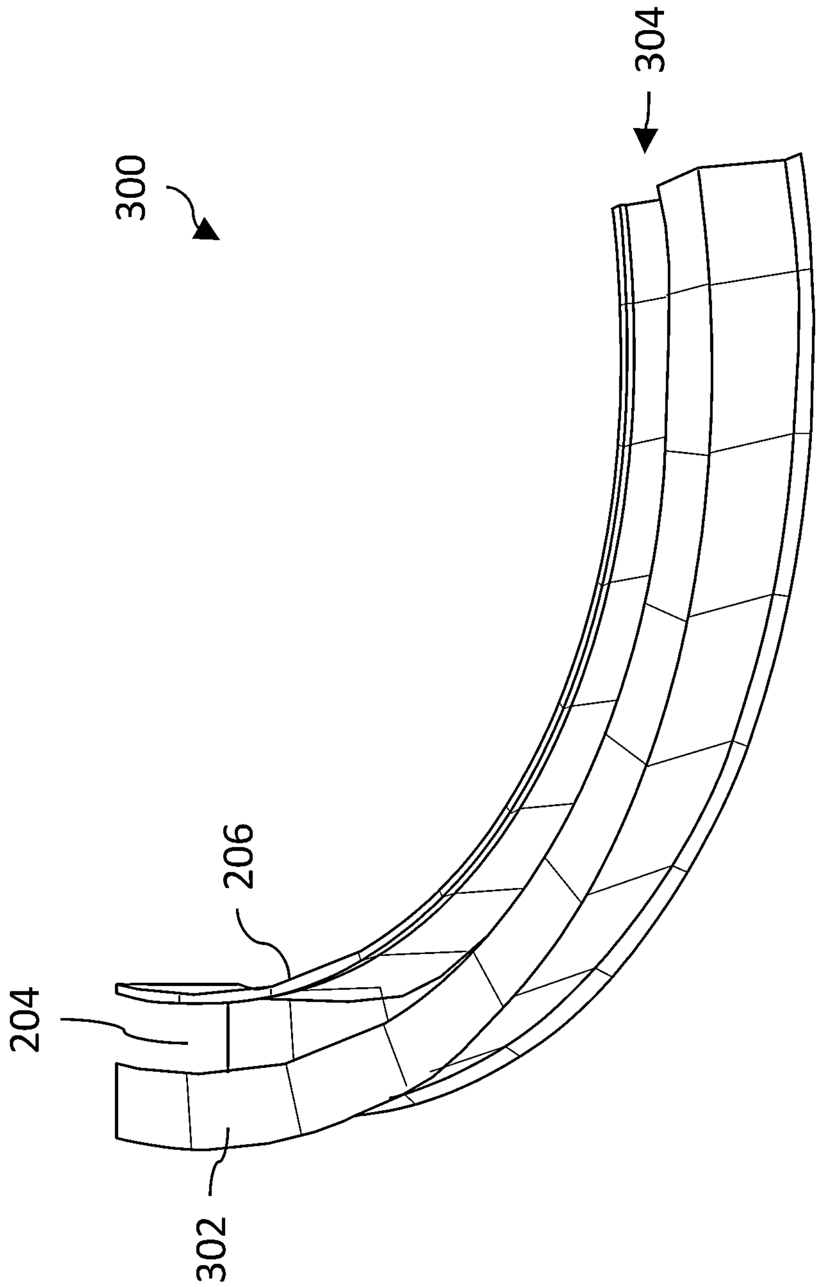
FIG. 3 illustrates a helmet attach mechanism as a groove that accepts a helmet rim.

FIG. 3 illustrates part of a housing 304 with the groove 204 for the rim lighting system 104. The housing 304 overall is a curved shape close to the curve of the front rim 402 of a helmet. The housing 304 has a groove 204 for the front rim 402 of a helmet to fit into. Behind the groove 204 is an inner lip 206 that is thin, and once the rim lighting system 104 is attached to the front rim 402, the inner lip 206 is on the inside of the helmet. In front of the groove 204 is an outer lip 302 where the forward light 110 and downward light 412 may be located.

The housing 304 may have a built-in helmet attach mechanism. The housing 304 may be made of rigid, semi-rigid, or flexible material that may conform to the front rim 402 of the helmet when the rim lighting system 104 is attached to a helmet. The housing 304 has a gap between the inner lip 206 and outer lip 302 that forms a groove 204. When attached to the helmet, the rim lighting system 104 is located radially inwards of the outer lip 302, and the groove 204 may frictionally engage the front rim 402 of the helmet to keep the rim lighting system 104 attached.

The rim lighting system 104 may have an array of forward light source 408 located in the housing 304 to provide the forward light 110. The forward light source 408 may be arranged to provide a substantially even illumination that is directed forward off the front of the helmet, substantially illuminating the work area of a user wearing the rim lighting system 104. Since the forward lighting 110 distributes light sources along the front rim 402 and the front rim 402 is close to the eyes, the rim lighting system 104 provides lighting of the work environment that is consistent, even, and free of shadows and bright spots. The rim lighting system 104 may have a light diffuser 410 on top of the light source or light sources. The rim lighting system 104 may have a set of small lights, for example, LEDs. The rim lighting system 104 may have other mechanisms to provide a diffuse light source.

Figure 4:
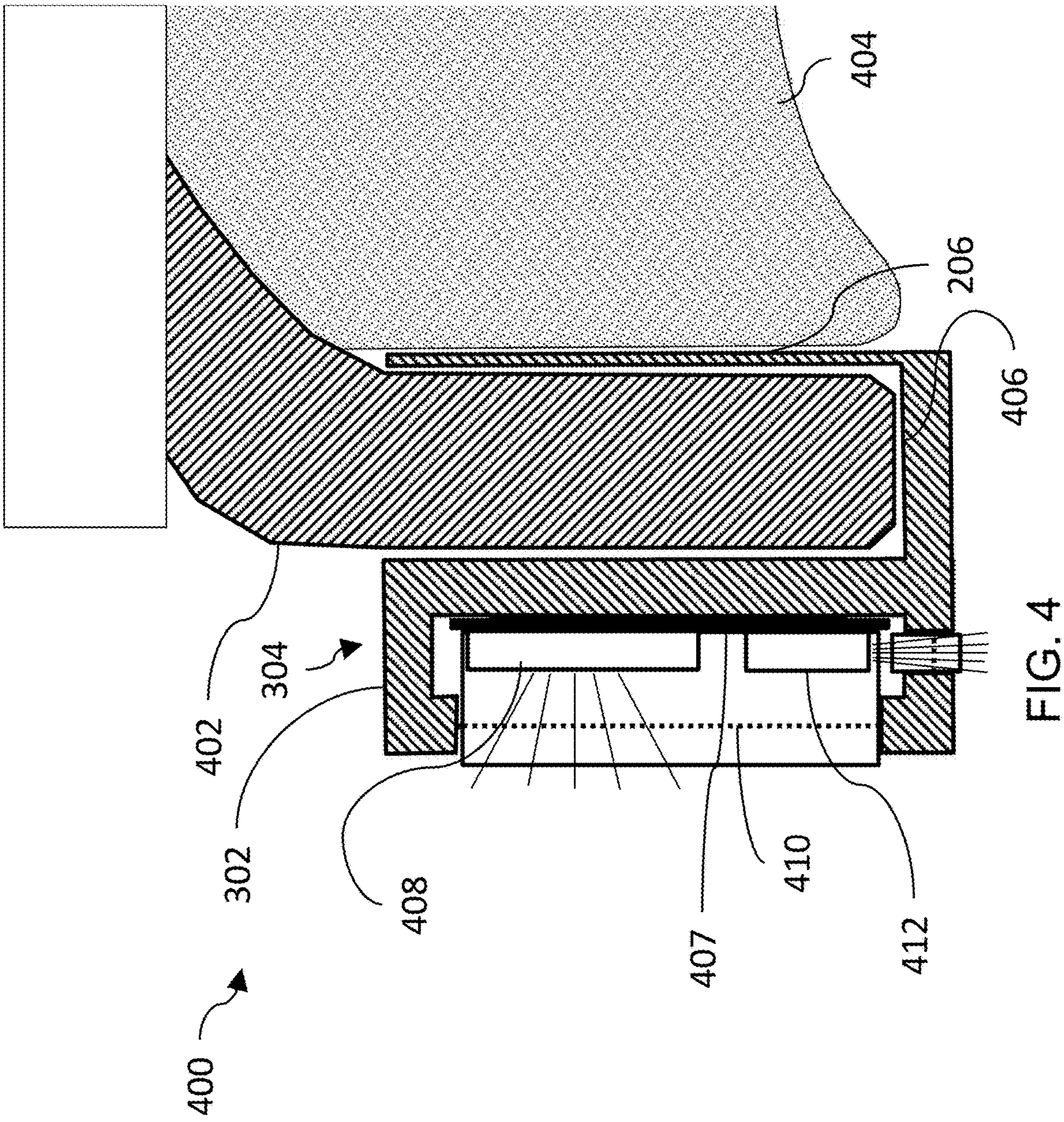
FIG. 4 illustrates a cross-section of the groove and how it may attach to a helmet rim.

FIG. 4 shows illustration 400 of a cross-section of a rim lighting system 104 with a housing 304 having an outer lip 302, an inner lip 206, and a gap in between with a groove bottom 406 that creates the groove 204. The rim lighting system 104 may include a circuit board 407 that holds a forward-light source 408, and a downward-light source 412.

The helmet attach mechanism may use the friction with the front rim 402 of the helmet. The inner lip 206 may fit between the inside front rim 402 and the helmet padding 404 to keep the rim lighting system 104 attached to the helmet. The helmet attach mechanism may use permanent or semi-permanent adhesive. The helmet attach mechanism may enable the easy removal of the rim lighting system 104.

The helmet attach mechanism may use hook-and-loop fastener, for example, Velcro®. The helmet attach mechanism may use two strips of hook-and-loop fastener. A first strip may be located radially inwards of the housing 304 and may be configured to engage with a second strip located on the front of the helmet near the front rim 402. The first strip may be the hook (i.e., rough) strip, and the second strip may be the loop (i.e., fuzzy) strip, or vice versa.

The rim lighting system 104 may be mounted centered on the front rim 402 and attached from the bottom or at the bottom of the front rim 402.

The rim lighting system 104 may have a helmet attach mechanism that is shaped to be tightly conformed to the curve of the helmet. The helmet attach mechanism may include a clip or clips that provide friction that holds or locks on the lip of the front rim. The clip may be integral to the housing of the rim lighting system 104.

The helmet attach mechanism may have an 'easily removable' attachment, for example by as formed clips in the housing.

The helmet attach mechanism may allow a 'semi-permanent' attachment, for example by use of adhesive, or hook and loop fastener. The adhesive or hook and loop fastener may be located on the groove bottom.

The helmet attach mechanism may include adhesive. The helmet attach mechanism may allow adhesive to be easily added to increase the security of the attachment.

The helmet attach mechanism may attach to a heat-resistant and strong synthetic fiber with high strength to weight ratio with no permanent modifications. Permanent modification to strong synthetic fiber, such as drilling holes, would compromise effectiveness of heat-resistant strong synthetic fiber. An example of a strong synthetic fiber with high strength to weight ratio is the material sold under the band brand Kevlar®. Compromise in the case of an army helmet may include compromising the ability of the helmet to stop bullets.

The rim lighting system 104 is shown with a housing on which is mounted the light source, for example a light emitting diode, LED. The housing may retain a directional diffuser. The light emitted by light source (forward light source 408 or downward-facing light 412) may go through the diffuser 410 and spreads the light more evenly than if the light directly came from the light source, forward-facing light 408 or downward-facing light 412. The use of the diffuser 410 can help provide more even illumination. This allows the device to remain relatively flat dimensioned with the downward-facing lights 412 oriented at 90 degrees relative to the front of the helmet while still providing light directionally downward to the work area.

The forward light source 408 of the rim lighting system 104 may be oriented at approximate 90 to 135 degree angle relative to the front of the helmet to prevent shadows caused by attaching the light emitting device above of the rim of the headgear facing forward.

The rim lighting system 104 may have multiple light sources, each consisting of strips of light-emitting elements oriented at specific angles relative to the front of the helmet to illuminate different areas. The control unit allows users to select individual light sources based on their lighting needs. For instance, there may be two light sources: a first strip of light-emitting elements (forward light source 408) oriented at 0°, pointing towards the horizon, and a second strip of light-emitting elements (downward-facing light 412) oriented downward at 85°. This arrangement enables users to choose between the two light sources according to their requirements.

The rim lighting system 104 provides a forward light that is a substantially even light source directed towards the horizon, radially outwards from the system, substantially illuminating the user's workspace without shadows when activated. The system illuminates the entire workspace in front of the eyes from approximately 5 inches, offering high lumen/high lux diffused light with minimal or no shadows from the wearer, due to its mounting location on the front of the helmet rim.

The rim lighting system 104 may feature adjustable light intensity and the capability to emit light of different frequencies. Light-emitting elements within the system can generate various light colors and even emit infrared (IR) light, compatible with night vision goggles (NVG) for improved visibility in low light environments. The rim lighting system 104, housed within the helmet, can radiate light forward and offer adjustable intensity, allowing users to modify the lumens or candelas produced as needed.

Figure 5:
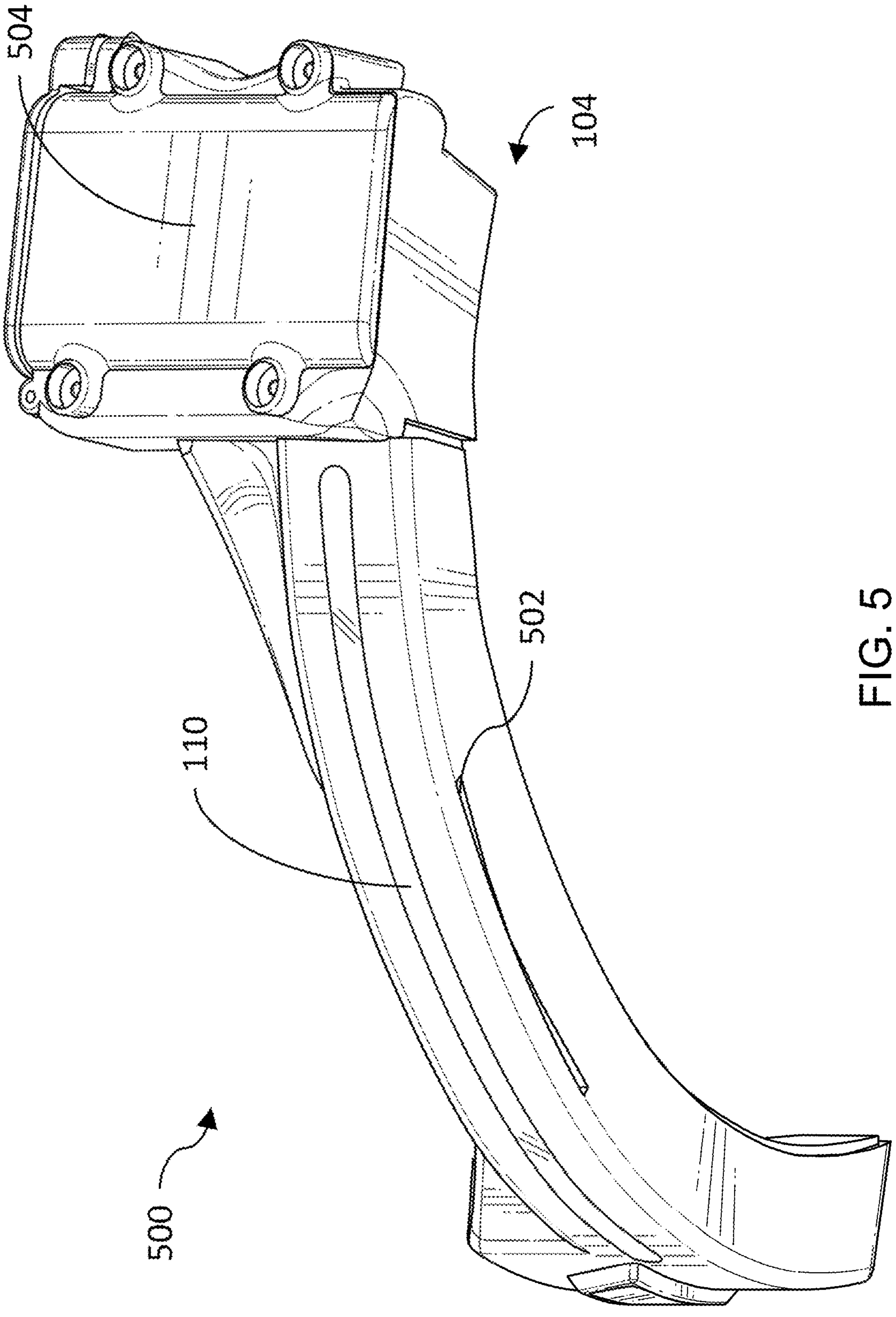
FIG. 5 illustrates a bottom perspective view of the rim lighting system.

FIG. 5 illustrates a bottom perspective view of the rim lighting system 104 with a downward light 502 and a battery container 504. The rim lighting system 104 may include a diffuser to allow the rim lighting system 104 system to remain relatively flat with the light-emitting elements oriented at 90 degrees relative to the front of the head gear while still providing light directionally downward to the users work area.

Figure 6:
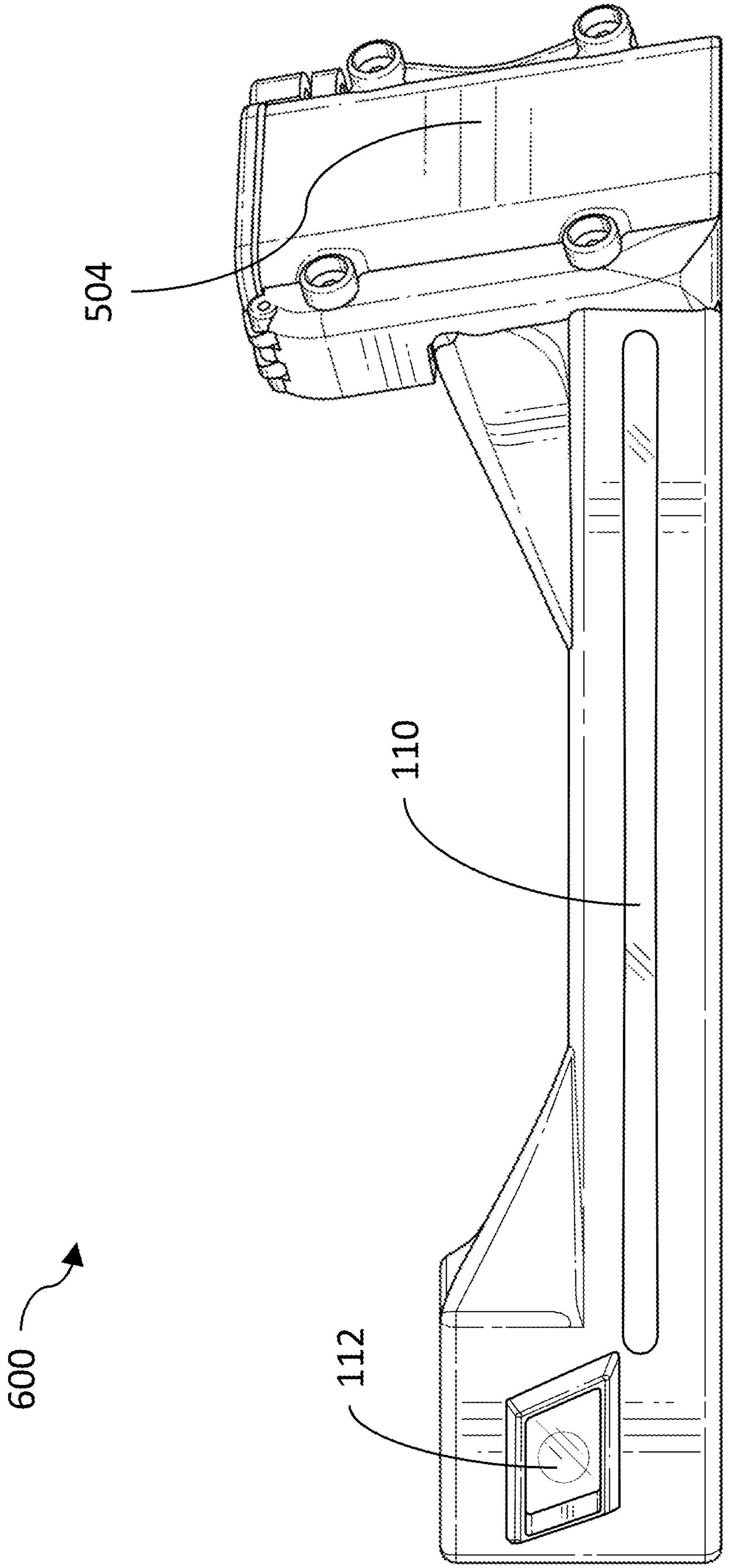
FIG. 6 illustrates a front view of the rim lighting system.

FIG. 6 illustrates a front view of the rim lighting system 104, with the input button 112, forward light 110, and battery container 504 visible.

The rim lighting system 104 may utilize a separate power source instead of having an integrated battery container 504. This separate power source may be located at the back of the helmet, maintaining a thin and low-profile design that minimizes interference with other helmet-mounted devices, allowing them to operate normally. The remote power source enables a thinner or wider system configuration for the rim lighting system 104. Positioning the power source at the rear of the military helmet can also improve balance. Power may be supplied through an integrated power system for example helmet battery rail as may be found on army helmets.

Figure 7:
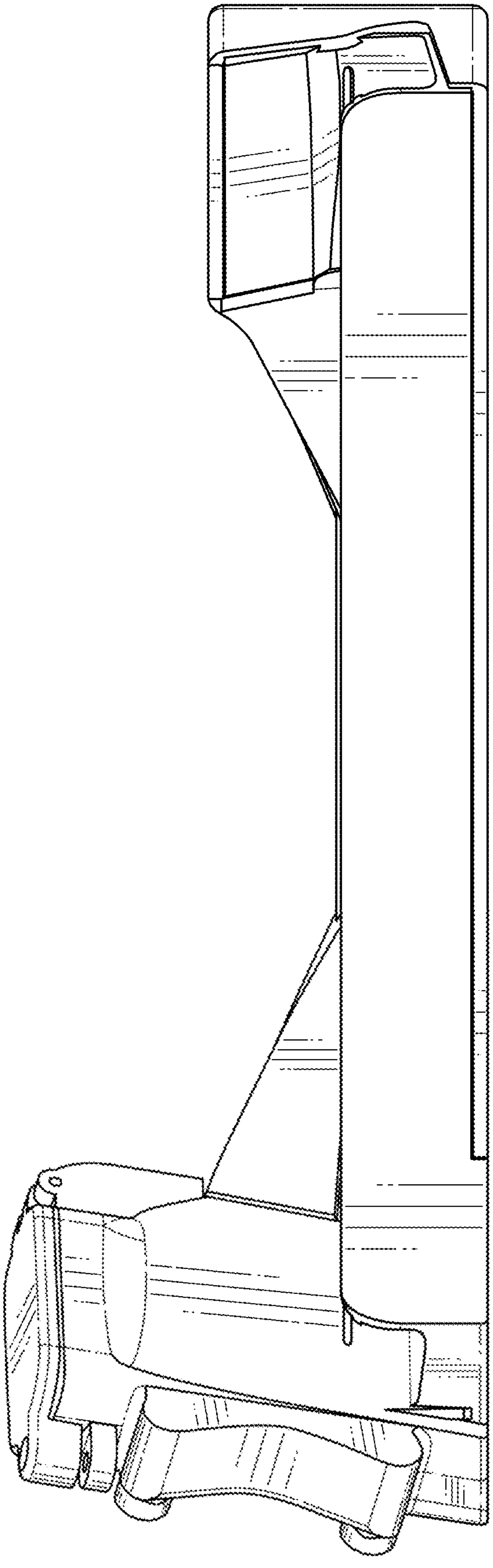
FIG. 7 illustrates a rear view of the rim lighting system.

FIG. 7 illustrates a rear view of the rim lighting system 104.

Figure 8:
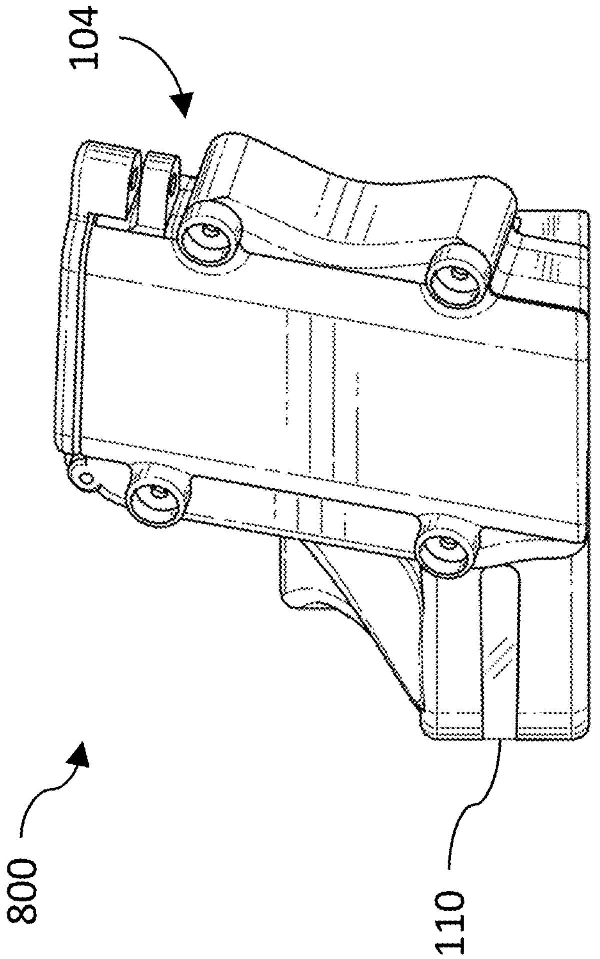
FIG. 8 illustrates a right view of the rim lighting system.

FIG. 8 illustrates a right view of the rim lighting system 104.

Figure 9:
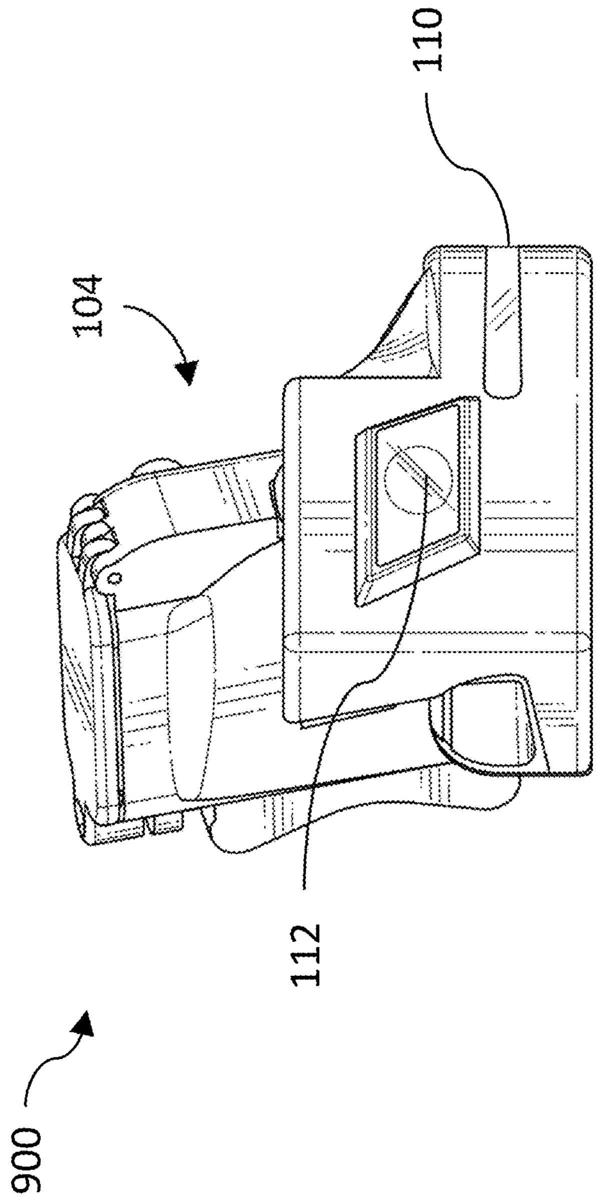
FIG. 9 illustrates a left view of the rim lighting system.

FIG. 9 illustrates a left view of the rim lighting system 104.

Figure 10:
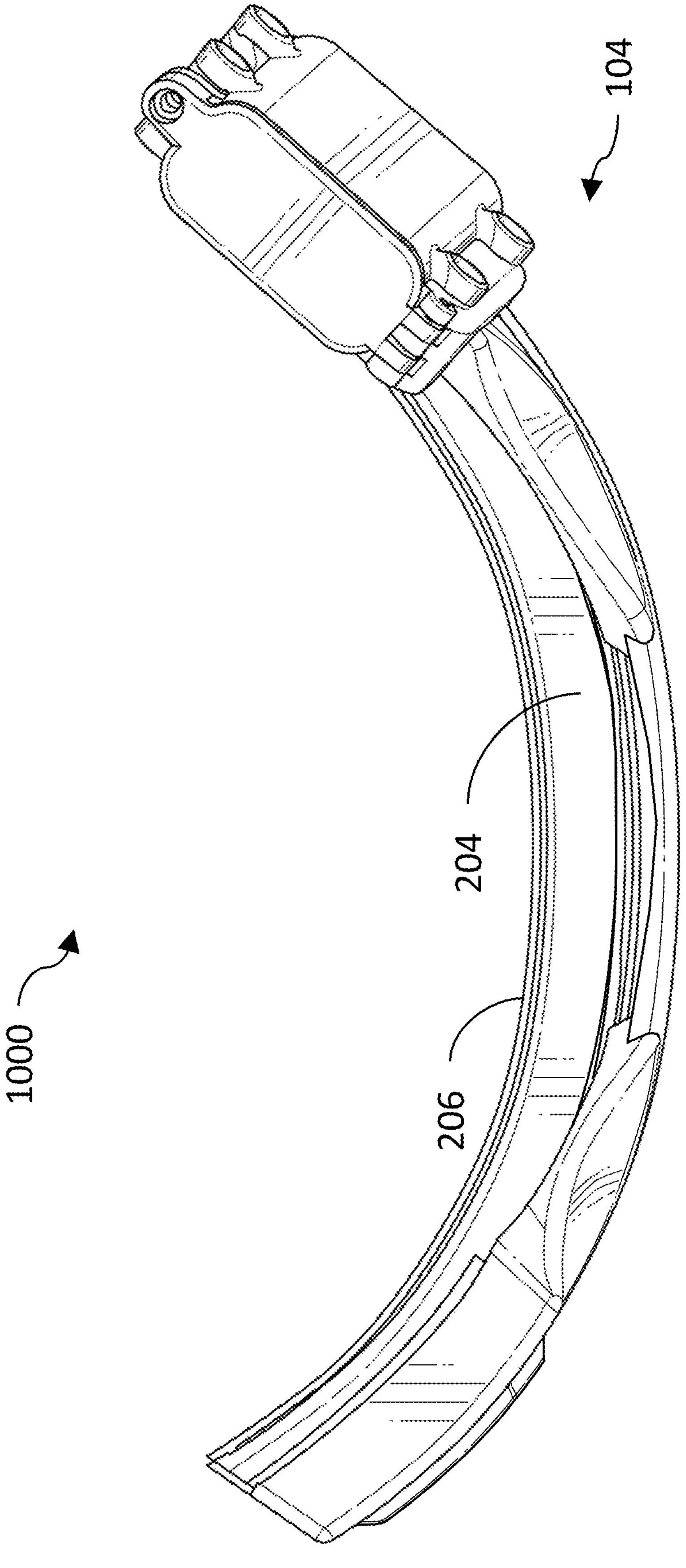
FIG. 10 illustrates a top view of the rim lighting system.

FIG. 10 illustrates a top view of the rim lighting system 104.

Figure 11:
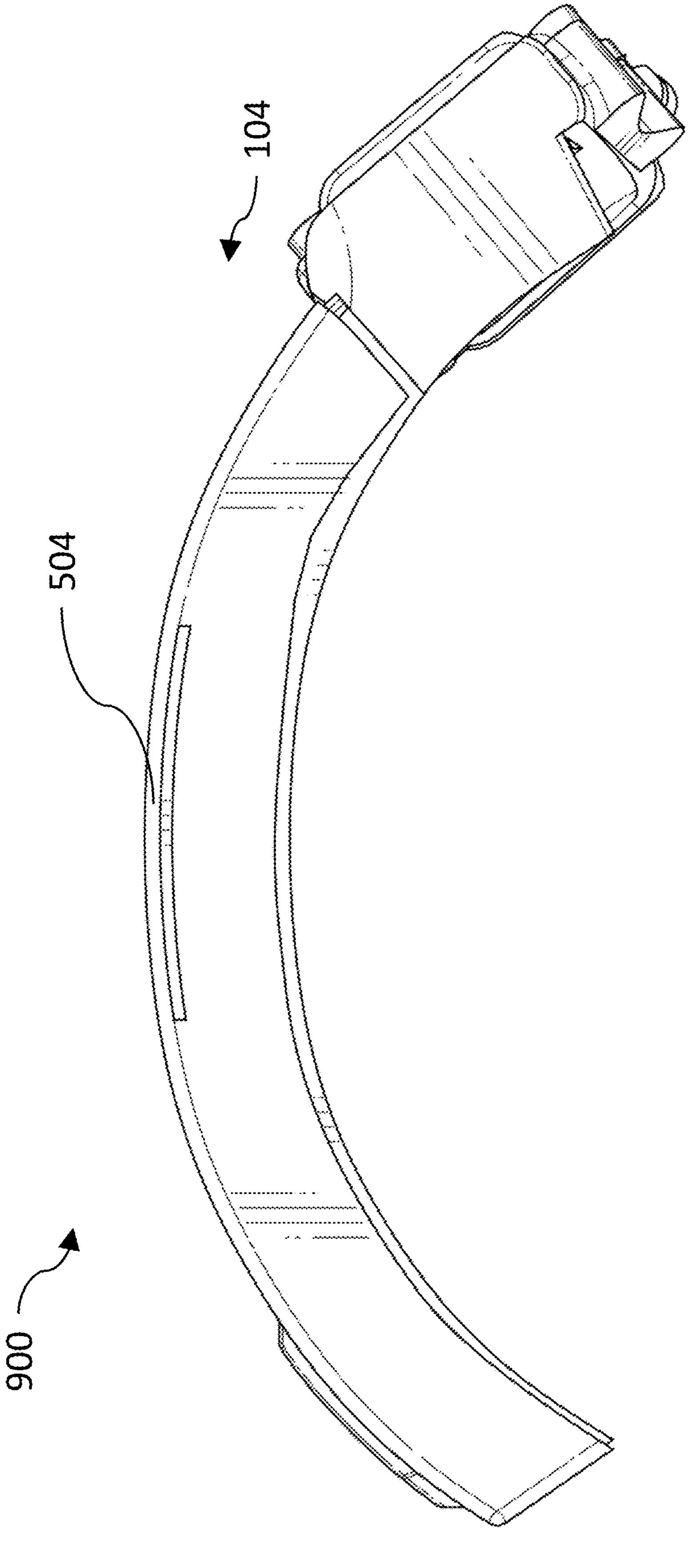
FIG. 11 illustrates a bottom view of the rim lighting system.

FIG. 11 illustrates a bottom view of the rim lighting system 104.

Figure 12:
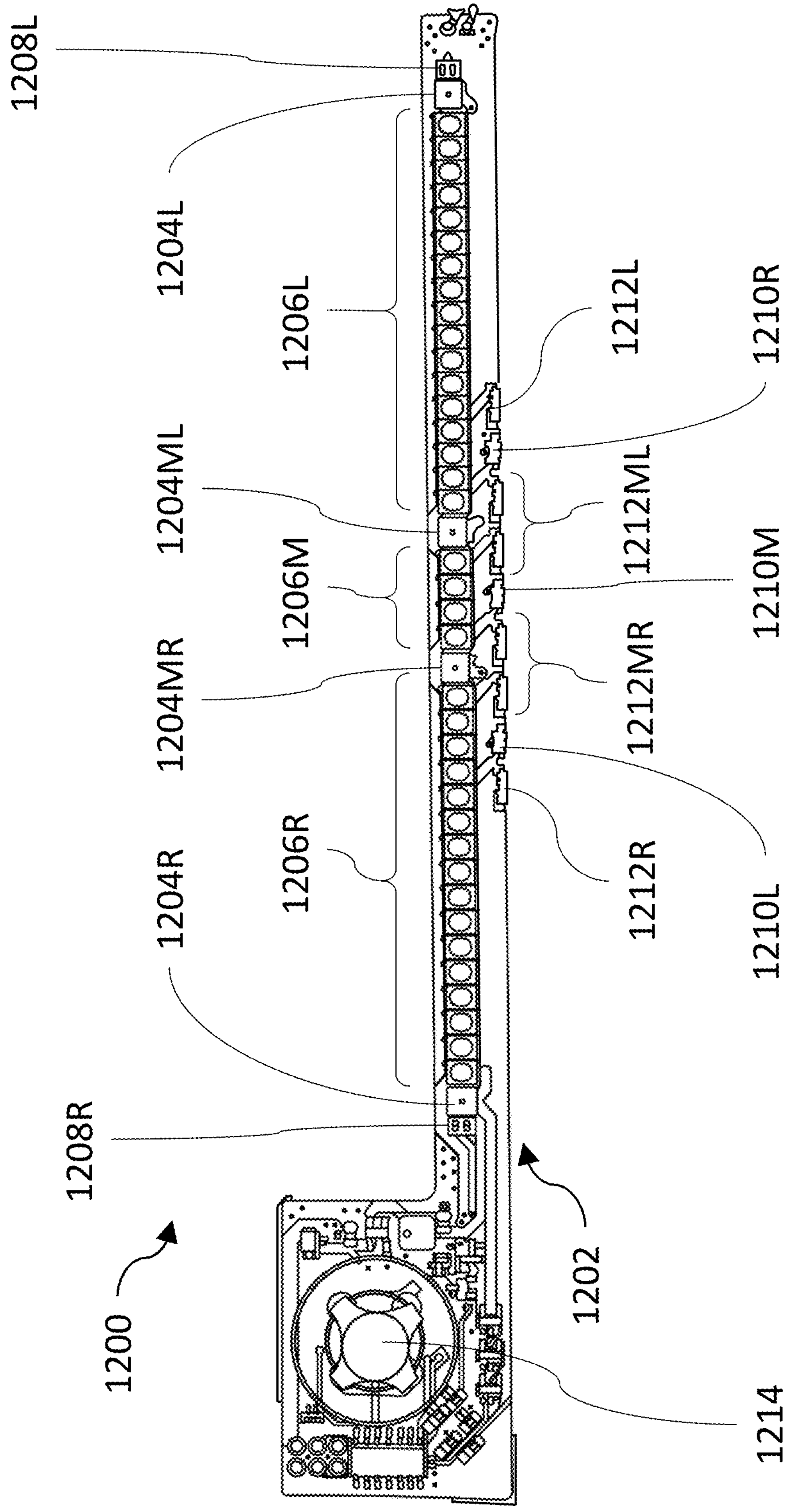
FIG. 12 illustrates a front view of a flexible circuit board with LED lights and a touch switch used in the rim lighting system.

FIG. 12 illustrates a front view of a flexible circuit board with LED lights and a push button switch 1214 used in the rim lighting system 104. The rim lighting system 104 may feature a forward-facing light that may produce a significant amount of infra-red (IR) light. The IR light may have an output in the range of 25 milliwatt per steradian, or 60 to 70 milliwatt per steradian, or up to 100 milliwatt per steradian.

The circuit board 1202 has various LEDs mounted on it, including forward red lights (right red LED 1204R, middle right red LED 1204MR, middle left red LED 1204ML, and left red LED 1204L), forward white lights (right group of white LEDs 1206R, middle group of white LEDs 1206M, and left group of white LEDs 1206L), forward IR lights (right IR LED 1208R and left IR LED 1208L), downward red lights (right right-angle red LED 1210R, middle right-angle red LED 1210M, and left right-angle red LED 1210L), and downward white lights (right right-angle white LED 1212R, middle right group of right-angle white LEDs

1212MR, middle left group of right-angle white LEDs 1212ML, and left right-angle white LED 1212L). A push button switch 1214 is also mounted on the circuit board 1202.

A right-angle surface mount LED is a type of LED package designed for surface mounting on a printed circuit board (PCB). Its unique feature is that it emits light at a right angle, or 90 degrees, relative to the surface of the PCB. This enables the light to be directed in specific directions, such as downward or sideways, as required by the design of the rim lighting system 104.

The push button switch 1214 may be used to cycle through the various forward lights and downward lights. If the rim lighting system 104 is off when the button switch 1214 is held more than a set period, for example 2 seconds, then the rim lighting system 104 may activate the IR lights (1208L and 1208R).

If the rim lighting system 104 is off when the button switch 1214 is pressed, the rim lighting system 104 may enter into the red-light cycle and first activate the downward red lights (1210R, 1210M, and 1210L). When pressed again then the rim lighting system 104 may next activate the forward red lights (1204R, 1204MR, 1204ML, and 1204L) on low. Pressing again may then have the rim lighting system 104 activate the forward red lights (1204R, 1204MR, 1204ML, and 1204L) on high. The red lights may be cycled through as many times as the button is pressed.

Figure 13:
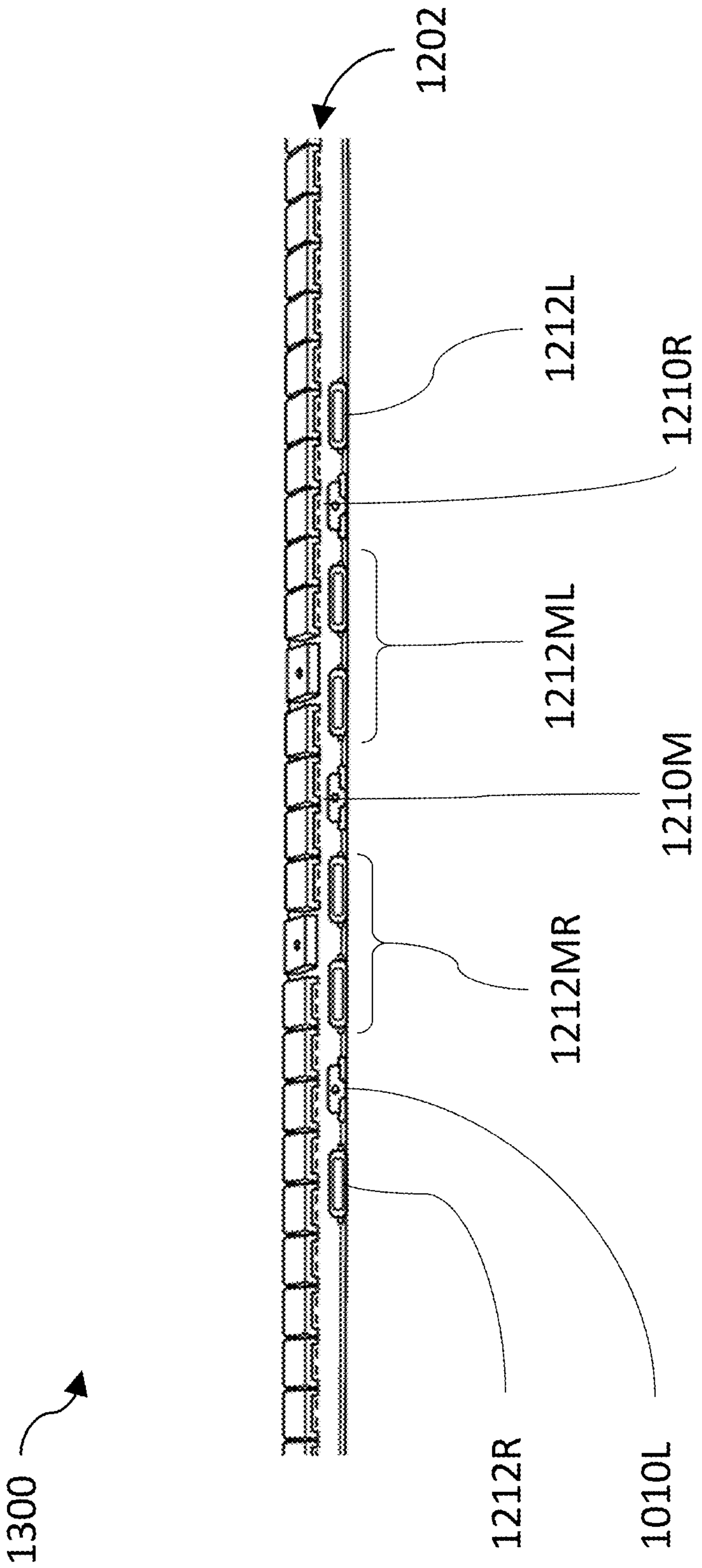
FIG. 13 illustrates a bottom perspective view of the flexible circuit board.

Holding the push button switch 1214 for a set period, for example, two seconds, when in the red light cycle may change to the white light cycle, where the first activation may be the down white lights (1212R, 1212M, and 1212L), and the second activation may be the forward white lights (1206R, 1206M, 1206L) on low, and the third activation may be the forward white lights (1206R, 1206M, 1206L) on high. A press and hold may turn the lights off FIG. 13 illustrates a bottom perspective view of the flexible circuit board 1202 showing the downward-facing light downward red lights (1210R, 1210M, 1210L) and white lights (1212R, 1212MR, 1212ML, 1212L).

Figure 14:
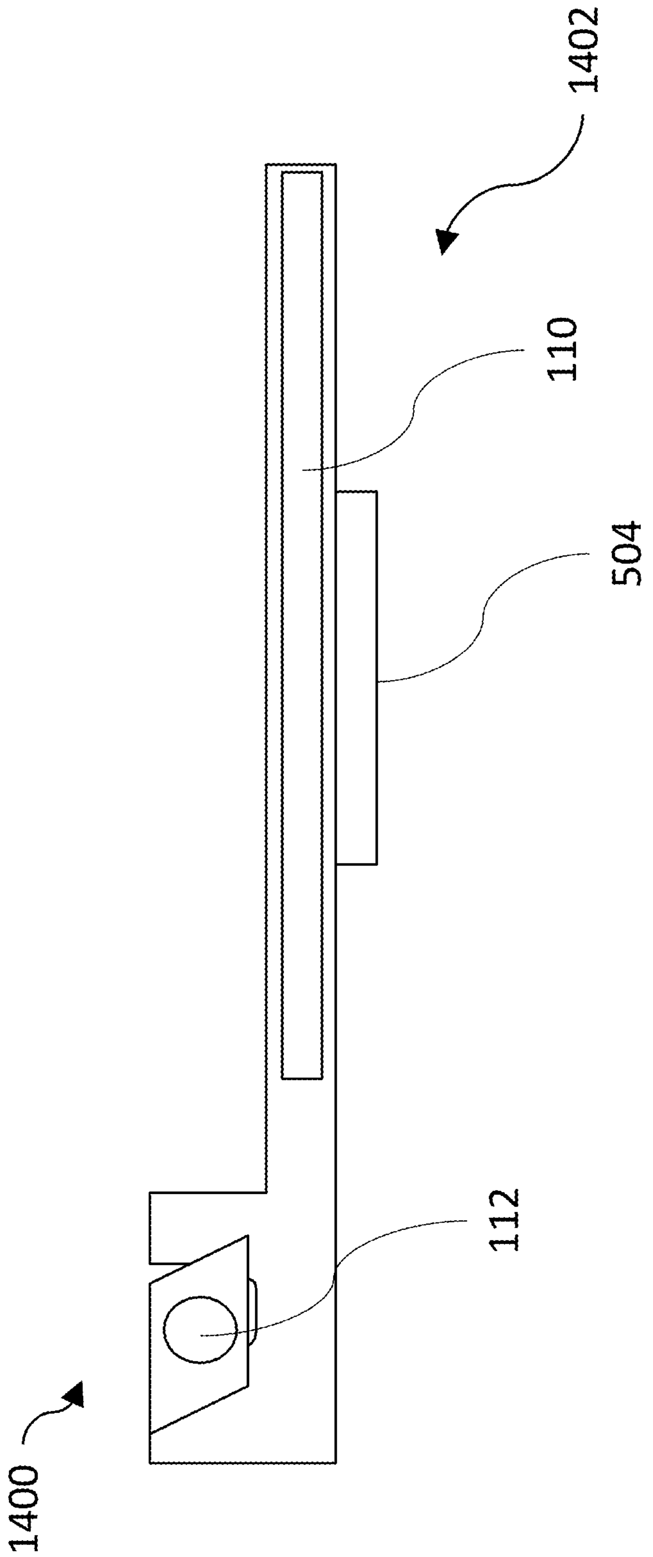
FIG. 14 illustrates a front view of a translucent diffuser and seal that goes over the flexible circuit board in the rim lighting system.

FIG. 14 illustrates a front view of the diffuser 1402 that also may server as a seal. The rim lighting system 104 is shown with a forward light-diffuser 110 that positions over the forward light and a downward light-diffuser 502 that positions over the downward light, a push button 112 that transmits the input to the switch, for example the push button switch 1214 on the circuit board 1202. The diffuser layer may effectively distribute the emitted light, creating a broader and more uniform beam pattern. As a result, the rim lighting system 104 may offer improved visibility and reduced glare in a variety of lighting conditions.

The housing of the rim lighting system 104 may have a cavity that accommodates both the forward-facing and downward-facing lights. The diffuser 1402 may be a silicone diffuser. The diffuser 1402 may fill the cavity, potentially serving a dual purpose of diffusing the light and providing a waterproof seal.

The diffuser 1402 may be implemented in various ways. It could be a rubbery, separately formed item that fits into the cavity or formed using a pourable compound like a pourable silicone that is directly added to the cavity and then cures. In either case, the diffuser may contribute to the waterproofing and sealing properties of the housing, enhancing the durability and functionality of the rim lighting system 104.

In the rim lighting system 104, the circuitry may be protected from moisture using a spray-on waterproofing treatment.

Figure 15:
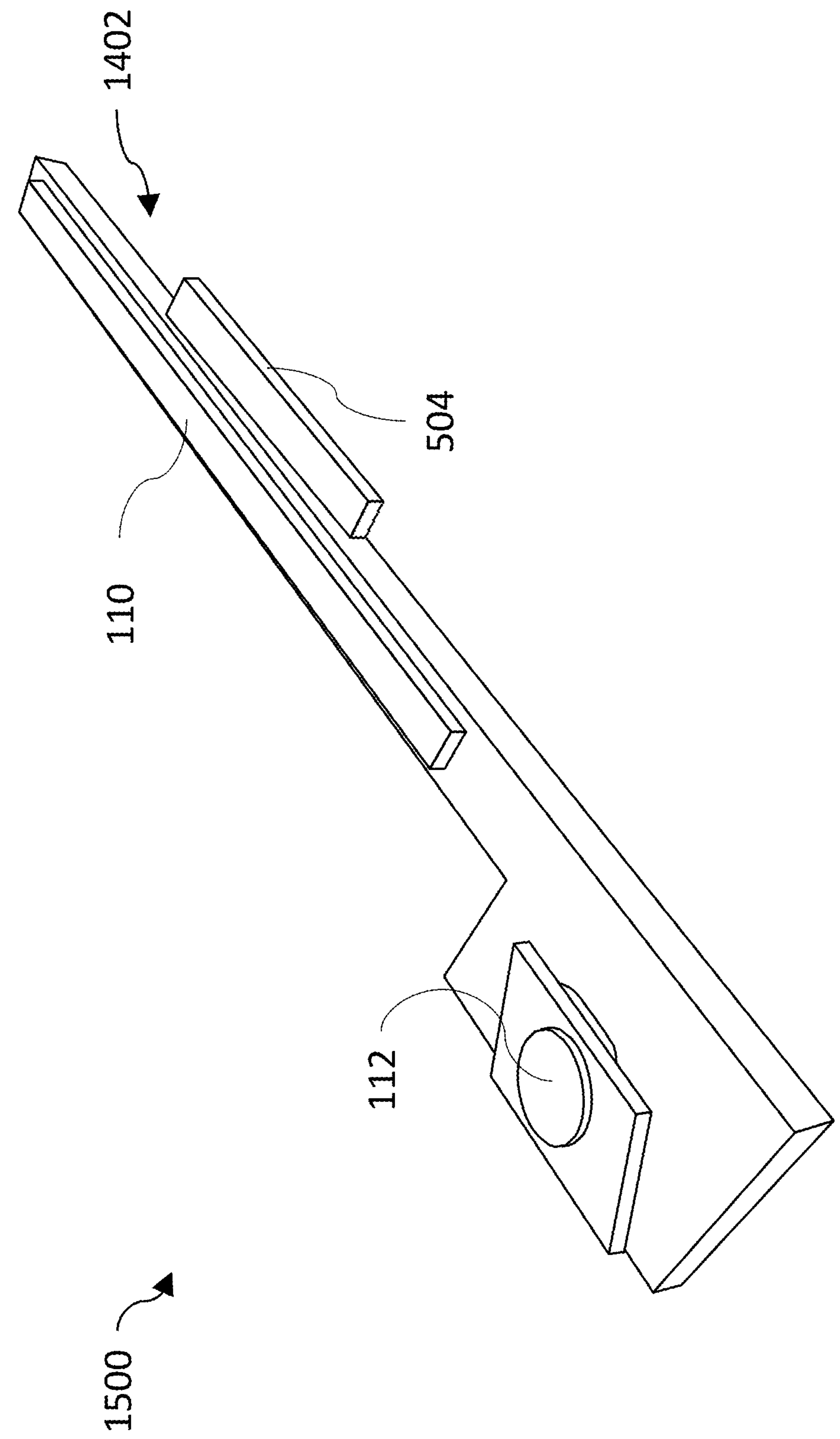
FIG. 15 illustrates a perspective view of the translucent diffuser and seal.

FIG. 15 illustrates a perspective view of the diffuser 1402 that shows the diffuser for the forward light—110, the diffuser for the downward light 502 and the button 112.

Figure 16:
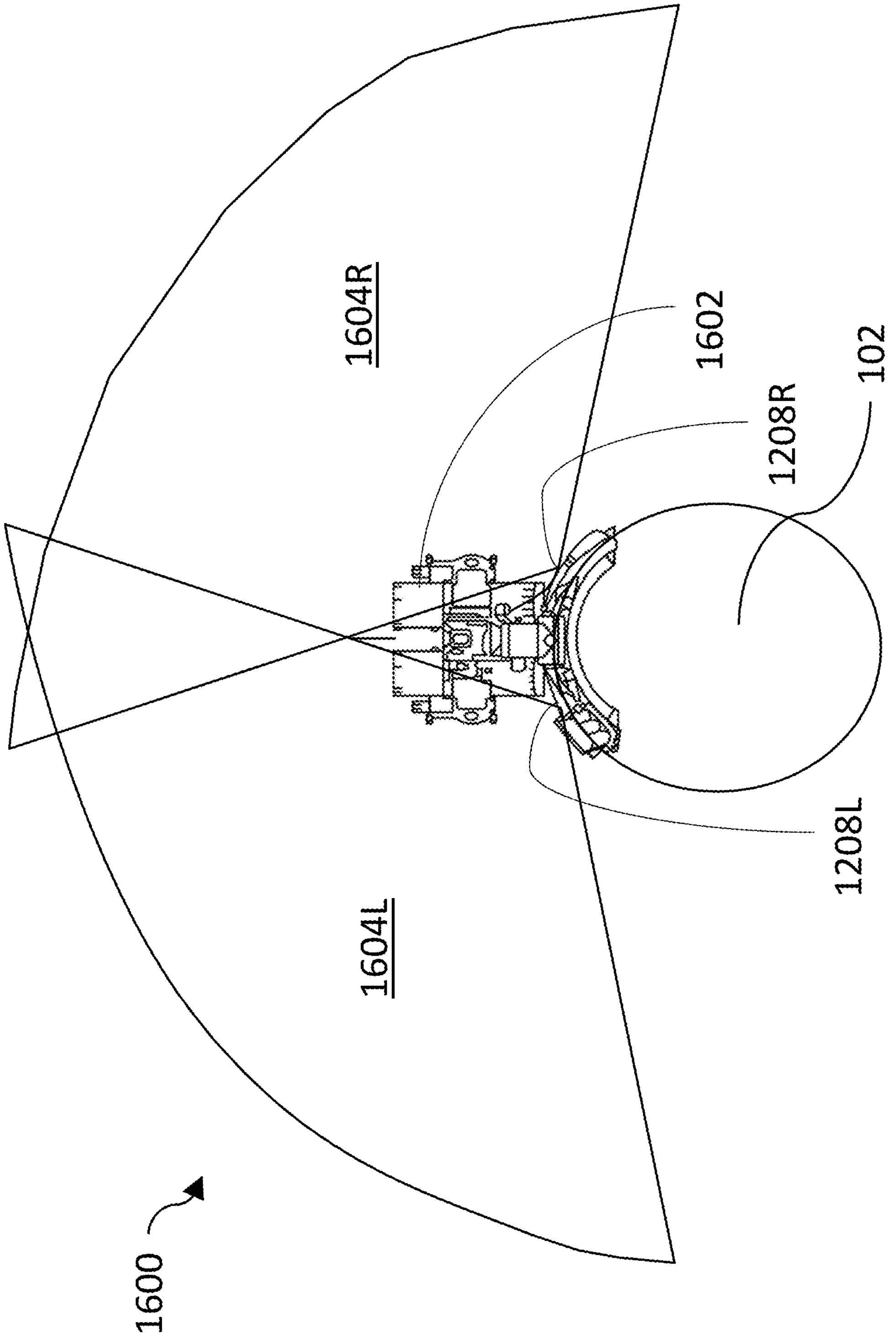
FIG. 16 illustrates a top view of the infrared light emanating from the rim lighting system when mounted on a military helmet.

FIG. 16 illustrates a top view of the infrared light emanating from the rim lighting system 104 when mounted on a military helmet 102. The rim lighting system 104 may include a right IR LED 1208R and a left IR LED 1208L, which create a wide light disbursement of more than 180 degrees through right light disbursement 1604R and left light disbursement 1604L.

The rim lighting system 104 may attach to the front rim of the helmet with IR LEDs oriented at approximately a 90 to 135-degree angle to the helmet center mirror plane, thus minimizing shadows caused by mounting above the lip and facing forward. This positioning minimizes shadows from the front lighting by keeping the light sources near the rim of the helmet and thus near the eyes of the helmet user.

The rim lighting system 104 may have light-emitting elements that are oriented at an approximate 90 to 135-degree angle relative to the front of the headgear, optimizing the functionality of helmet-mounted Night Vision Goggles 1602.

Figure 17A:
FIG. 17A presents a photograph of a room illuminated by white light from a prior-art helmet-mounted light.

FIG. 17A shows a prior art white light picture 1700A of a prior art military helmet mounted light on a mannequin sitting in a locker-room facing lockers with 3 white sheets of paper on the bench in front of the mannequin and the mannequin hold a fourth piece of paper. The prior art white light picture 1700A shows the prior art helmet light illuminates with a white light flashlight and items outside of the narrow beam of light fail to be properly illuminated.

Figure 17B:
FIG. 17B presents a photograph of a room illuminated by the white forward light of the rim lighting system.

FIG. 17B shows a current white light picture 1700B the light-emitting capability of the rim lighting system 104. The locker-room, representing the workspace of a user is evenly and broadly illuminated. The rim lighting system 104 illuminates in the workspace clearly illuminating the locker, the three pieces of paper on the bench. This is in sharp contrasted with prior art white light picture 1700A where the Prior Art provides a focused light that fails to illuminate the work environment properly.

Figure 17C:
FIG. 17C presents a photograph of a room illuminated by the white downward light of the rim lighting system.

FIG. 17C presents a downward white light picture 1700C of a room illuminated by the white downward light of the rim lighting system 104. This shows the handheld paper brightly lite, which is in stark contrast to the prior art white light picture 1700A where only the corner of the hand-held paper is only slightly illuminated.

Figure 18A:
FIG. 18A presents a photograph captured through one lens of a night vision binocular, of a room illuminated by prior art infrared helmet-mounted light.

FIG. 18A presents a prior art IR photograph 1800A captured through one lens of a night vision binocular, of a room illuminated by prior art infrared helmet-mounted light. The photograph 1800A shows a circular light zone that is low light and one can see two of the white papers on the bench, and the third bench paper is nearly invisible in the dark outside the circular light zone.

Figure 18B:
FIG. 18B presents a photograph captured through the lens of a night vision binocular, of a room illuminated by the infrared forward light of the rim lighting system.

FIG. 18B presents a current IR photograph 1800B captured through the lens of a night vision binocular, of a room illuminated by the infrared forward light of the rim lighting system 104. The IR photograph 1800B, in contrast to the prior art of IR Photograph 1800A, shows a broader and more uniform illumination of the workspace.

The invention claimed is:

1. A helmet rim lighting system comprising:

a helmet attach mechanism configured to attach to the rim of a helmet, a housing that holds electronics and when the helmet attach mechanism is attached to the rim of the helmet, is configured to produce forward light rays and is configured to produce downward light rays, where:

the forward light rays originate from at least one forward-facing light source, where the at least one forward-facing light source that is fully contained inside the housing, the downward light rays originate from at least one downward-facing light source, where the at least one downward-facing light source that is fully contained inside the housing, and the helmet attachment mechanism has a thin extension configured to be sandwiched between a mounting surface of a night vision goggle mount and an outer surface of the helmet when the night vision goggle mount is bolted to the helmet using night vision goggle mount holes of the helmet.

* * * * *